United States Patent [19]

LaValley

[11] Patent Number: 4,608,171
[45] Date of Patent: Aug. 26, 1986

[54] ADJUSTABLE MOUNTING FOR VALVE-DISCHARGE ELBOW OF ROTARY DRUM FILTERS

[75] Inventor: Richard W. LaValley, Vancouver, Wash.

[73] Assignee: LaValley Industrial Plastics, Inc., Vancouver, Wash.

[21] Appl. No.: 750,320

[22] Filed: Jun. 28, 1985

Related U.S. Application Data

[63] Continuation-in-part of Ser. No. 737,824, May 24, 1985.

[51] Int. Cl.⁴ .............................................. B01D 33/06
[52] U.S. Cl. .................................. 210/404; 210/392; 210/429; 162/321; 162/323; 162/334; 162/357; 162/369; 162/370
[58] Field of Search ............... 162/321, 323, 334, 357, 162/369, 370; 210/217, 392, 402, 403, 404, 429, 430, 784

[56] References Cited

U.S. PATENT DOCUMENTS

| Re. 27,326 | 4/1972 | Sheaffer | 210/404 |
|---|---|---|---|
| 915,436 | 3/1909 | Hencke | 210/404 |
| 2,052,156 | 8/1936 | Young | 210/404 |
| 3,363,774 | 4/1965 | Luthi | 210/404 |
| 3,452,874 | 7/1969 | Keller | 210/404 |
| 3,630,380 | 12/1971 | Barnedl | 210/404 |
| 4,056,475 | 11/1977 | Sander | 210/402 |
| 4,154,687 | 5/1979 | LaValley | 210/404 |
| 4,383,877 | 5/1983 | LaValley | 210/404 |
| 4,419,165 | 12/1983 | LaValley | 210/404 |

Primary Examiner—Ernest G. Therkorn
Attorney, Agent, or Firm—Klarquist, Sparkman, Campbell, Leigh & Whinston

[57] ABSTRACT

A vacuum breaker valve-discharge elbow assembly for a rotary drum filter of the pipe machine type is adjustably mounted to the drive gear housing for the filter via a separate mounting plate. A valve flange is secured to the mounting plate. The mounting plate is in turn transversely and axially adjusted on the gear housing via adjusting bolts to accurately seat the valve within its valve housing in the drum. The discharge elbow is then secured to the mounting plate independently of the valve. The valve can be rotationally adjusted on the mounting plate without disturbing the prior axial and transverse adjustment of the plate and valve by providing slotted fastener access holes on the valve flange and close-tolerance valve flange guide shoulders on the mounting plate. Cooperative calibration plates on adjacent valve flange and mounting plate surfaces facilitate precise angular adjustment of the valve.

15 Claims, 8 Drawing Figures

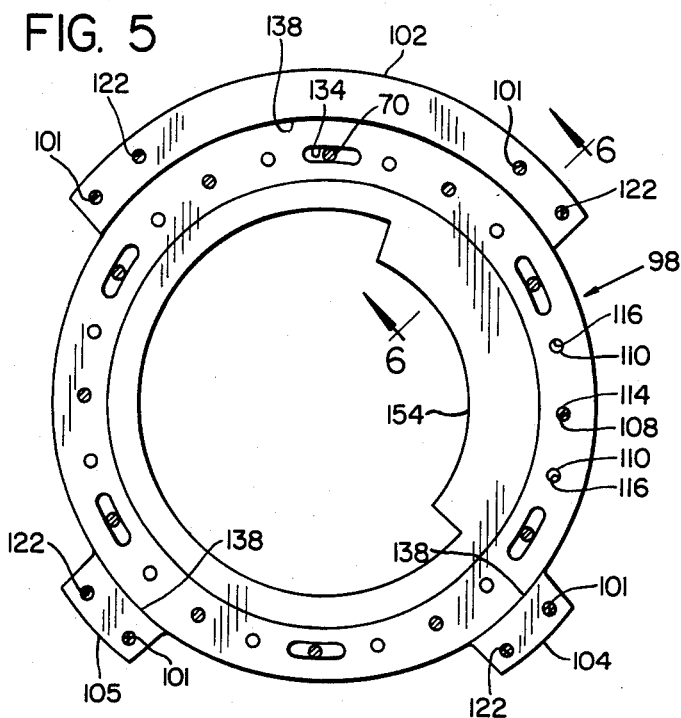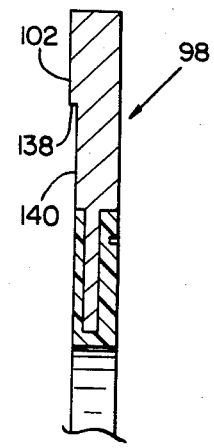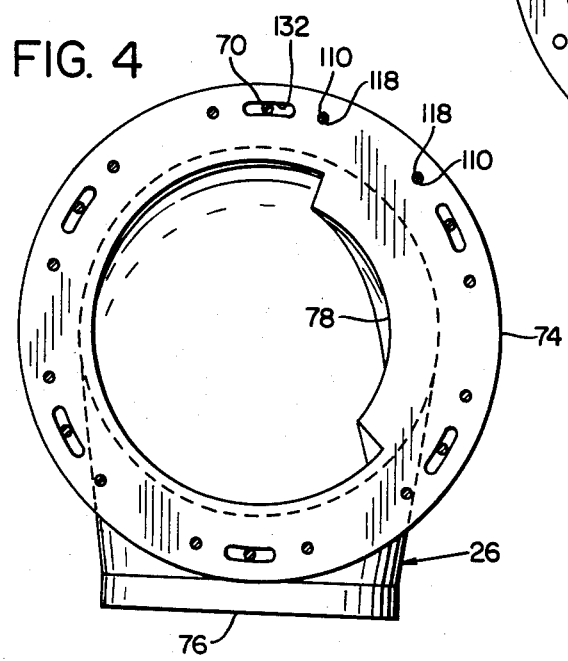

ADJUSTABLE MOUNTING FOR VALVE-DISCHARGE ELBOW OF ROTARY DRUM FILTERS

RELATED APPLICATIONS

The present application is a continuation-in-part of co-pending application Ser. No. 737,824, filed May 24, 1985 for improved vacuum breaker-discharge elbow for filter drums.

FIELD OF THE INVENTION

The present invention relates to rotary drum filters used in the pulp and papermaking industry to form a mat of wood pulp and separate the mat from its filtrate. The invention relates especially to such filters of the pipe machine type in which there is a vacuum breaker valve and discharge elbow assembly at one end of the drum filter for controlling the application of suction to the filter surface and the drawing of filtrate from the mat and drum. More particularly, the invention relates to an improved adjustable mounting method and apparatus for the breaker valve-discharge elbow assembly for such a drum filter.

BACKGROUND OF THE INVENTION

A drum filter of the pipe machine type comprises a rotary drum partially submerged in a tank of pulp slurry. Typically, the drum has axially extending filtrate channels spaced about its peripheral surface defined by ribs and covered by a filter screen. The surface filtrate channels communicate with an external source of subatmospheric pressure, or suction, through drainage pipes, an annular valve housing mounted centrally within the discharge end of the drum, a stationary vacuum breaker valve member seated within the valve housing and extending therefrom, and a discharge elbow connected to the outlet end of the valve member. The stationary valve member has a valve closure segment which blocks off a section of multiple discharge ports in the valve housing to control the application of subatmospheric pressure to the connected drainage pipes and surface filtrate channels.

As the drum rotates about its axis with suction applied, the screen rotates through the pulp slurry and collects a wet mat or "cake" of fibres from the slurry. As the screen emerges from the tank, filtrate is drawn from the mat through the screen and filtrate channels into the drainage pipes, and from there through the valve housing and into the valve member and discharge elbow to remove the filtrate from the drum. During rotation of the drum, the stationary valve closure segment cuts off suction to the filtrate channels in a segment of the drum surface, thereby enabling removal of the pulp mat from the screen surface, usually with the aid of a doctor device.

Rotary drum filters of the described pipe machine type are shown, for example, in U.S. Pat. No. 3,363,774 to Luthi and U.S. Pat. No. 4,383,877 to LaValley.

Typically, the stationary valve member for such a drum filter, partially shown in FIG. 7 of the Luthi patent, has a cylindrical valve plug at its inlet end which is seated within the valve housing. A conically tapered valve closure segment extends rearwardly from the plug to cover a portion of the valve housing outlet ports to block them from the source of suction. A large central shaft extends rearwardly from the plug and outwardly beyond the discharge end of the drum, connecting with an annular flange and sealing rim at the outlet end of the valve member, such outlet end portion not being shown in the Luthi patent. Usually, a hollow generally cylindrical drive trunnion or shaft connected to the drum surrounds the shaft portion of the valve member to define a portion of the filtrate discharge passage leading from the drum. The outlet end of the valve member joins an inlet end of the discharge elbow at respective flanges, bolted together. The outlet end of the elbow, in turn, connects to a suction pipe leading to the source of subatmospheric pressure. The drive trunnion or shaft is enclosed within a stationary drive housing, shown in the vicinity of item 24 in FIG. 1 of the Luthi patent. The drive housing houses the drum drive means, typically a worm gear or chain drive.

The drive housing typically is part of the drum support structure and serves as a support for the valve member. A flange on the discharge elbow bolts to the valve flange to form the valve-elbow assembly. Ears on the elbow flange bolt to the drive housing to support the valve-elbow assembly on the drive housing. However, seating of the valve closure segment precisely within the drum's valve housing is critical. Therefore means must be provided for adjusting the position of the elbow flange both axially and transversely of the valve member on the drive housing to achieve proper seating of the segment. Such means usually include both axial and radial adjustment bolts acting between the elbow flange and the drive housing.

Proper seating of the valve closure segment is complicated by the fact that the valve member and discharge elbow must be securely bolted together at their flanges when the seating adjustment is made because the elbow flange connects the valve member to the drive housing. When the elbow is connected to the valve member, access to the valve housing and segment end of the valve member is extremely limited, making accurate seating difficult and tedious. Seating can only be accomplished through trial and error using a feeler gauge affixed to a long stick inserted through a small inspection port in the elbow.

Rotational adjustment of the valve closure segment relative to the valve housing is also important to ensure that the drum surface is cut off from suction to enable removal of the mat at a precise angular position of such surface during drum rotation. However, with the valve member supported from the drive housing by the elbow flange, precise rotational adjustment of the valve segment is also difficult and tedious because of the access problems previously described. In addition, many types of prior valve-discharge elbow assemblies do not accomodate rotational valve adjustment at all, at least not without their complete disassembly.

From the foregoing, it will be apparent that there is a need for an improved method and means for seating and rotationally adjusting the valve closure segment of a vacuum breaker valve within the valve housing of a rotary drum filter. This need, in turn, suggests the need for an improved method and means for mounting the valve member and discharge elbow to the drive housing of a rotary drum filter that will simplify and improve the accuracy of seating and rotationally adjusting the valve closure segment in the valve housing.

In view of the foregoing needs, primary objectives of the present invention are to provide:

1. an improved method and means for seating and rotationally adjusting the valve member in the valve housing of a rotary drum filter; and 2. an improved method and means for mounting a valve-discharge elbow assembly that simplifies, speeds up, and renders more accurate, the seating and rotational adjustment of the valve member in the valve housing of a rotary drum filter as compared to prior such methods and means.

More specific objectives of the present invention include the provision of an improved method and means for mounting a valve-discharge elbow assembly to a rotary drum filter which enable (a) seating of the valve member while the discharge elbow is removed from the valve member, (b) rotational adjustment of the valve member with the elbow either connected to or disconnected from the valve member as desired; (c) rotational adjustment of the valve member without the need for access to the valve housing and without the use of a feeler gauge; (d) rotational adjustment of the valve member without the need for reseating it; and (e) removal of the discharge elbow from the valve-elbow assembly for valve inspection or adjustment without the need for reseating or readjusting the valve upon reassembly of the valve and elbow.

SUMMARY OF THE INVENTION

The foregoing objectives are carried out in accordance with the present invention through the provision of an improved method and means for mounting the valve-discharge elbow assembly to the stationary drive housing of a rotary drum filter. The improved mounting, in turn, provides an improved method and means for seating and rotationally adjusting the valve member in the valve housing. Such methods and means are characterized by one or more of the following features:

1. Both the valve member and the discharge elbow are independently connected to a common but separate, intermediate mounting plate means. The mounting plate means, in turn, is connected to the drive housing, thereby to mount both the valve member and the elbow to the drive housing, but independently of one another.

2. Adjusting means are provided for both axially and transversely adjusting the mounting plate means relative to the drive housing while the valve member is secured to the mounting plate means but the discharge elbow is disconnected from such plate means, thereby enabling seating of the valve member within the valve housing with the discharge elbow removed.

3. Means may be provided for rotationally adjusting the valve member while the mounting plate means remains adjustably secured to the drive housing and the valve member remains connected to the mounting plate means. This feature enables rotational adjustment of the valve without the need to reseat the valve and with the elbow either removed from or connected to the mounting plate means as desired.

4. The rotational adjustment means for the valve member may include calibration and cooperative indexing means on juxtaposed peripheral flange portions of the mounting plate means and connected valve flange. This feature enables precise angular adjustment of the valve segment within the valve housing without the need for access to the valve housing and while the valve and discharge elbow remain assembled and adjustably secured to the drive housing.

5. Means may be provided for connecting and disconnecting the discharge elbow from the mounting plate means without disconnecting the plate means from the drive housing and without disconnecting the valve member from the plate means. This feature enables access to the interior of the valve member for inspection or maintenance while the discharge elbow is removed and without disturbing the seating or rotational adjustment of the valve member in the valve housing.

6. The valve-discharge elbow assembly may include the unique structural features disclosed more particularly in the aforementioned co-pending application Ser. No. 737,824, filed May 24, 1985 wherein the assembly defines a streamlined discharge flow path for the filtrate liquid. Such assembly is characterized by a valve member which includes a structural extension of the valve closure segment throughout the length of the valve member to structurally interconnect the valve segment and valve connecting flange. The discharge elbow may include a continuation of such valve segment extension, but with the segment continuation diminishing progressively in angular and radial extent from the inlet end of the discharge elbow in a direction toward its outlet end. The mounting plate means may include a corresponding segment so that there is a continuation of the arcuate segment throughout the valve member and transition to the discharge elbow. The mounting plate and elbow segments may be of an angular extent which is slightly less than the angular extent of the valve segment such that rotational adjustment of the valve member relative to the mounting plate and elbow will not present any downstream flow obstruction in the flow passage.

The foregoing and other objects, features and advantages of the present invention will become more apparent from the following detailed description which proceeds with reference to the accompanying drawings.

BRIEF DESCRIPTION OF THE DRAWINGS

FIG. 3 is a view taken along the line 3—3 of FIG. 2 showing the valve connecting flange portion of the valve member;

FIG. 4 is a view taken along the line 4—4 of FIG. 2 showing the elbow connecting flange portion of the discharge elbow.

FIG. 5 is a view taken along the line 5—5 of FIG. 2 showing the mounting plate for the valve-discharge elbow assembly;

FIG. 6 is a sectional view taken along the line 6—6 of FIG. 5.

DETAILED DESCRIPTION OF A PREFERRED EMBODIMENT

General Arrangement

Figure 1:
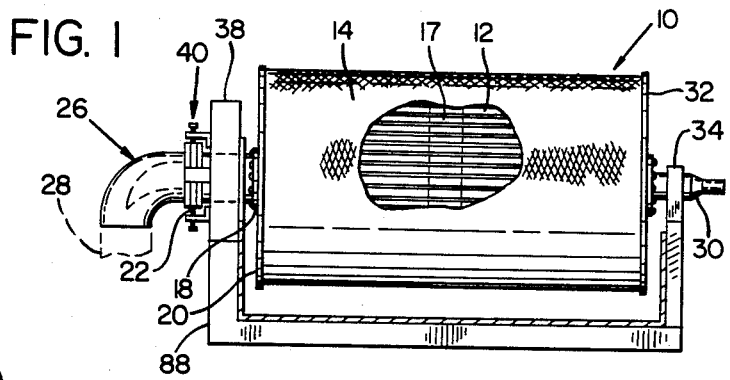
FIG. 1 is a somewhat schematic front elevational view of a rotary drum filter including a valve discharge elbow assembly and drive mounting in accordance with the invention.
Figure 2:
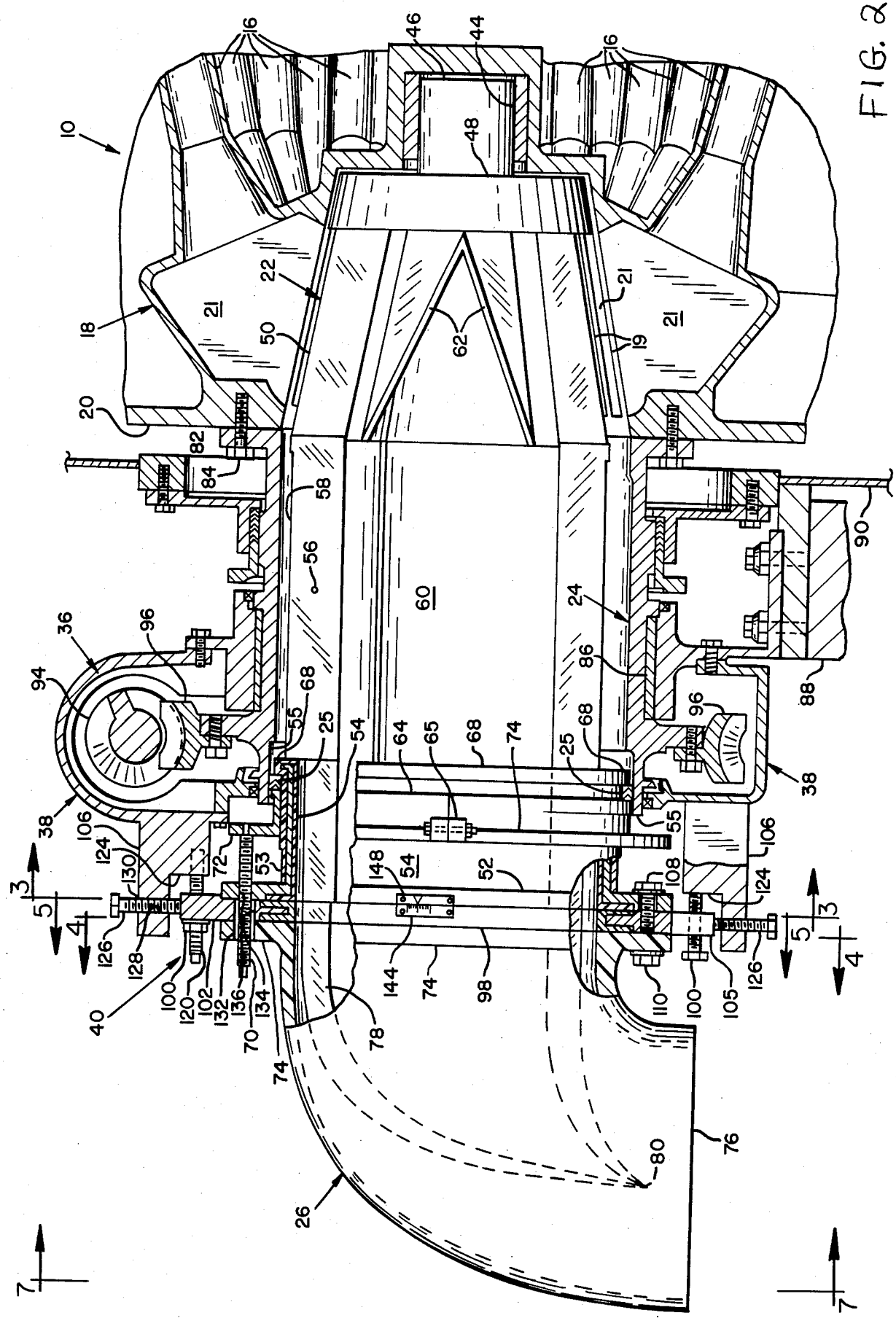
FIG. 2 is an enlarged elevational view, partly in section, of the discharge valve end portion of the drum filter of FIG. 1 showing the mounting details of the discharge elbow-valve assembly.

With reference to FIGS. 1 and 2, a rotary drum filter 10 of the pipe machine type includes a cylindrical surface with longitudinally-extending filtrate channels 12 covered with a filter screen 14. The filtrate channels drain into various drainage pipes 16 (FIG. 2) which lead from intake openings 17 at a central portion of the cylindrical surface to an annular valve housing 18 at a discharge end 20 of the drum. A stationary valve member 22 extends into the valve housing 18 through a hollow rotary drive trunnion 24 connected to end 20 of the drum. Stationary valve member 22 in turn joins a discharge elbow 26 which is connected at its downstream end to a suction pipe 28 leading to a source of subatmospheric pressure (not shown).

Hollow drive trunnion 24 and a tail shaft 30 at opposite end 32 of the drum rotatably support the drum for rotation about its axis on stationary drum support pedestal means 34. The drum is rotated about its axis through an appropriate drive, such as the worm gear drive 36 housed within the stationary gear housing 38 at the discharge end of the drum and driven by a motor (not shown). The stationary drive housing, part of the drum support means, serves to support the outlet end of valve member 22 and inlet end of discharge elbow 26 through an appropriate connection indicated generally at 40.

As shown in FIG. 2, annular valve housing 18 is partitioned by radially extending ribs 19 into chambers 21 which communicate with drainage pipes 16 and define outlet ports for discharging filtrate from the drum. Filtrate leaves the drum through valve member 22, surrounding hollow drive trunnion 24 and discharge elbow 26. The same elements communicate subatmospheric pressure from the source to the drum surface filtrate channels 12 as permitted by the stationary valve member 22.

Vacuum Breaker Valve

Valve member 22 comprises a unitary valve body including a tapered inlet end portion seated within valve housing 18, and a spaced annular outlet end portion interconnected by an intermediate portion extending within drive trunnion 24.

The inlet end portion includes a journal shaft 46 which rotatably supports the valve body within a bearing sleeve 44 of valve housing 18 and projects forwardly from a conically tapered valve plug 48. A conically tapered valve closure segment 50 extends rearwardly from plug 48. Segment 50 is sized and shaped to fit closely within the conical valve housing space defined by the radially inner edges of valve housing ribs 19 to block off a selected segment of the valve chambers 21 defined by such ribs from the source of vacuum. More specifically, valve closure segment 50 defines a segment of a conical tube, for both its interior and exterior surfaces are conically tapered, as shown and described in detail in co-pending application Ser. No. 737,824.

The annular outlet end portion of the valve body includes a valve connecting means in the form of an annular valve connecting flange 52. Such outlet portion also includes an annular sealing rim 54 extending toward the drum from the flange and having a cylindrical exterior surface 53. This surface cooperates with an overlapping sealing flange 55 of drive trunnion 24 and conventional packing material 25 therebetween to form a fluid seal between the stationary sealing rim of the valve member and the rotating drive trunnion 24. A split packing gland collar 64 closed by screw-adjustable tightener 66 urges the packing 25 against a stop lip 68 of sealing rim 54 under the influence of adjusting bolts 70 acting against a flange 72 of the collar to expand the packing into fluid-sealing engagement between the trunnion and sealing rim.

The intermediate portion of the valve body comprises a cylindrically curved extension segment 56 which forms a rearward continuation of valve closure segment 50. The extension segment structurally interconnects the valve closure segment at the inlet end and the valve flange 52 and sealing rim 54 portions at the outlet end of the valve member, and is the only structural interconnection therebetween. Both the exterior surface 58 and the interior surface 60 of the extension segment are cylindrically curved (FIG. 3). This will be most apparent from the disclosure of the aforementioned co-pending application which is incorporated herein by reference.

The interior surface of the extension segment cooperates with a portion of the interior surface of surrounding drive trunnion 24 to define a major portion of the filtrate discharge flow passage through the valve body. From the aforementioned co-pending application and FIG. 3 it will also be apparent that the cross sectional shape of the flow passage through the valve body will be generally that of a segmented circle and is generally streamlined, there being substantially no abrupt changes in cross-sectional area of the flow passage from one end of the valve member to the other, and no substantial interior obstruction of such passage in the valve member. Extension segment 56 extends continuously from its juncture with valve closure segment 50 to valve flange 52, thereby serving as a structural support for the sealing rim and valve flange. A pair of gussets 62, shown in FIG. 2, extend between and interconnect the closure segment and valve plug 48 to reinforce the connection therebetween, but without creating any substantial obstruction in the flow passage.

Discharge Elbow

Discharge elbow 26 defines a continuation of the flow passage defined by the valve body. The discharge elbow includes a connecting means at its inlet end in the form of an elbow connecting flange 74. This flange is used in a manner to be described, in conjunction with the valve flange, to interconnect the valve member and discharge elbow to form the valve-discharge elbow assembly. The discharge elbow also includes outlet end 76 which is normally received within the inlet end of suction tube 28 (FIG. 1). The elbow curves smoothly from its horizontally-directed inlet end to its vertically-directed outlet end, forming a smoothly-curving flow passage to minimize turbulence and energy loss within the elbow as described more particularly in the aforementioned co-pending application. The elbow may also be provided with an inspection port (not shown).

The flow passage at the inlet end of the discharge elbow has generally the same segmented cross sectional shape and substantially the same cross sectional area as the flow passage at the outlet end of the valve member. This is achieved through the provision of an elbow segment 78 which forms a continuation of the valve extension segment. However, in the downstream discharge direction within the elbow, the elbow segment 78 diminishes progressively both in angular or circumferential extent and in radial extent such that it disappears at point 80. Thus there is a gradual transition of the cross sectional shape and area of the flow passage within the elbow from that of a segmented circle to that of a full circle at outlet 76. Moreover, the cross sectional area of the flow passage at the outlet end of the valve is substantially the same as its area at the inlet end of the elbow. This feature ensures that there is no abrubt change in cross sectional area of the flow path from the valve member to the elbow which could otherwise cause substantial head loss at this point. Moreover, the smoothly curving elbow minimizes head loss as the flow path changes direction in the elbow.

As described thus far, the valve member and related discharge elbow are substantially as described with respect to co-pending application Ser. No. 737,824. However, the manner in which the valve and discharge elbow are assembled together, adjusted, and mounted to the stationary gear casing for the drum filter is markedly different from that employed in other known valve-discharge elbow assemblies.

Rotary Drum Drive and Mounting

Rotary drive trunnion 24 includes a flange 82 through which bolts 84 attach the trunnion to discharge end 20 of the drum filter. The trunnion in turn is rotationally supported by a bearing 86 at the upper end of a trunnion support 88 just outside the end wall 90 of a vat which retains the pulp slurry and receives lower surface portions of the drum filter.

In the illustrated embodiment of FIG. 2, the drive means for driving the trunnion and thus the drum includes a worm gear 94 within gear housing 38. The worm gear drives a ring gear 96 attached to the trunnion, and the ring gear is also housed within gear housing 38. Gear housing 38 is secured to the upper end of drum support 88.

Although there is a rotary seal as previously described between the drive trunnion and the sealing rim of the valve member, the trunnion does not support the outer end of the valve member. Other means are provided for this purpose, including the stationary drum support means 88 which includes the connected gear housing 38.

Valve-Discharge Elbow Assembly and Mounting

It is usually convenient, if possible, to connect the valve-discharge elbow assembly at the interconnection of the elbow and valve to the stationary drum support means, and more specifically to the stationary gear housing of such support means. In the present invention, this is done in a unique manner as follows:

Still referring to FIG. 2, a valve mounting means in the form of a generally annular mounting plate 98 is positioned between valve connecting flange 52 and elbow connecting flange 74. First threaded connecting means in the form of cap screws 100 extend through an upwardly extending arcuate flange portion 102 and radially extending lower pair of ears 104, 105 of the mounting plate to threadedly secure the mounting plate to bosses 106 of gear housing 38.

Second threaded connecting means in the form of cap screws 108 secure the valve flange 52 to mounting plate 98. Third connecting means in the form of additional cap screws 110 secure elbow flange 74 to mounting plate 98.

As will be apparent from a comparison of FIGS. 3, 4, and 5, valve flange 52 and elbow flange 98 are independently connected to mounting plate 98 so that each can be disconnected or loosened from the mounting plate without disconnecting or loosening the other from such plate. Six arcuate clearance slots 112 (FIG. 3) provide the valve flange openings through which valve flange connecting screws 108 extend through the valve flange into threaded engagement with tapped holes 114 at six corresponding positions on the mounting plate (FIG. 5). Offset on opposite sides of each valve flange screw hole 114 on mounting plate 98 is a pair of tapped elbow flange screw holes 116 to receive elbow flange connecting screws 110. Untapped holes 118 (FIG. 4) are provided at locations on elbow flange 74 corresponding to the positions of tapped screw holes 116 on mounting plate 98.

It will be noted that there are twice as many elbow flange screw holes 116 in mounting plate 98 as there are valve flange screw holes 114 in such plate. The reason is that the valve flange is of metal construction whereas the elbow flange is entirely of fiberglass-reinforced plastic construction, the latter requiring closer centers for its connectors.

From the foregoing, it will be apparent that each of the elbow and valve flanges can be secured to the mounting plate without the other being secured to such plate. Conversely, each can be disconnected from the mounting plate without disconnecting the other from such plate or even disturbing the adjustment of the other on the plate. However, the plate serves as the medium for interconnecting the valve member and elbow to form the valve-elbow assembly and for supporting such assembly from the gear housing. Use of such plate leads to important advantages.

Figure 7:
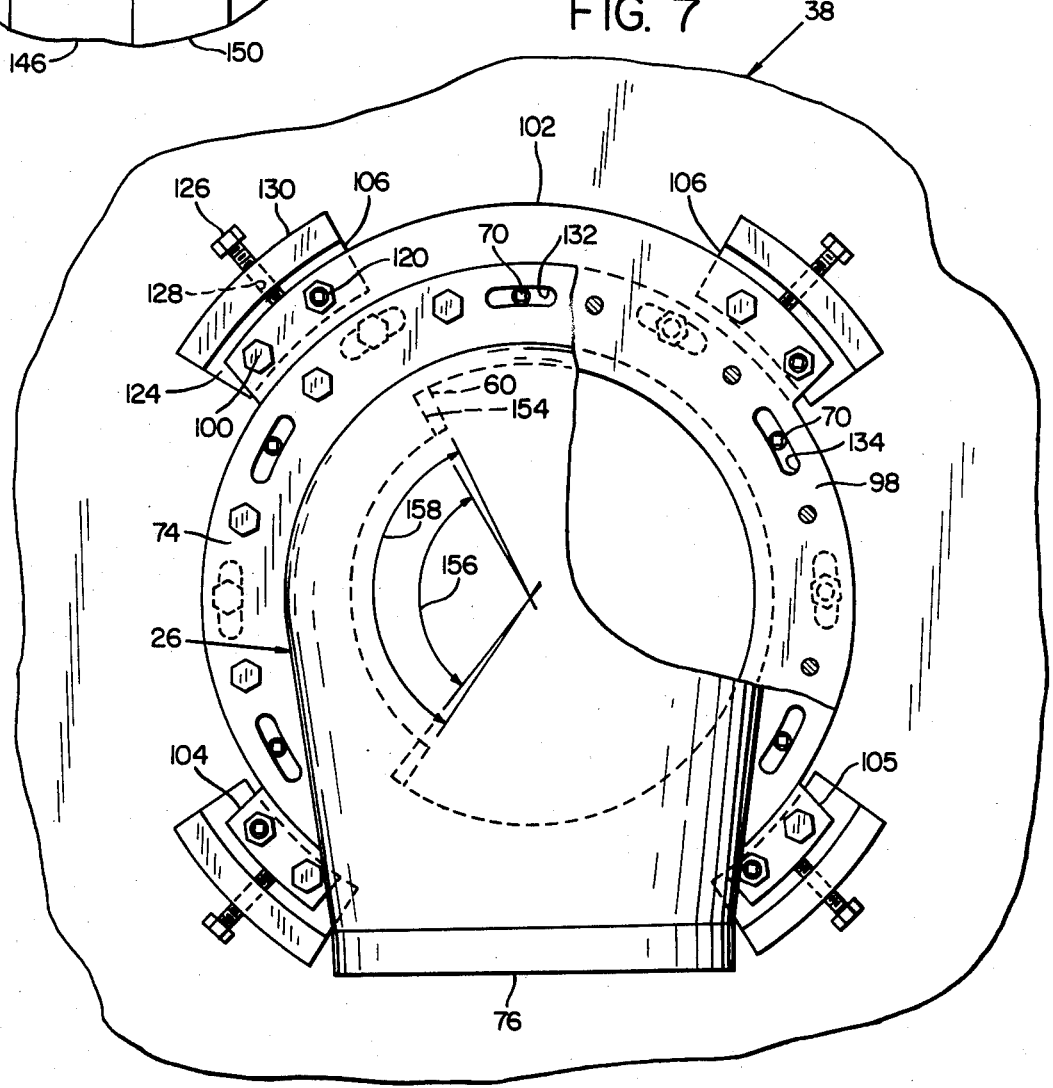
FIG. 7 is a view, partly broken away, of the valve-discharge elbow assembly as viewed from the line 7—7 of FIG. 2.

Because accurate seating of valve segment 50 within valve housing 18 is critical to the proper operation of the filter drum, and further because the valve member is supported primarily by mounting plate 98 from gear housing 38, adjustment of the mounting plate relative to the gear housing is critical to proper seating and adjustment of the valve member. Six horizontal adjustment bolts 120 extending through tapped holes 122 in the mounting plate top flange 102 and ears 104, 105 into abutment against vertical surfaces 124 of gear housing bosses 106, in conjunction with connecting screws 100, provide a means for axial adjustment of the mounting plate and thus the valve member relative to valve housing 18. Four radially directed adjusting bolts 126 extending through tapped holes 128 in ear extensions 130 of gear housing bosses 106 into abutment with the top surfaces of top flange extension 102 and ears 104, 105 of the mounting plate provide transverse adjusting means for the mounting plate and thus for the connected valve member 22 relative to its valve housing. This transverse adjusting feature is best shown in FIG. 7. Together, bolts 120 and bolts 126 provide valve seating means.

The previously-mentioned adjusting bolts 70 adjust the position of packing gland collar 64 on sealing rim 54 of the valve member. These bolts extend through aligned clearance slots 132, 134, respectively, in elbow flange 74 and mounting plate 98 and through tapped holes 136 in valve flange 52 into abutment against the packing gland collar flange 72.

It is necessary for optimum performance of the drum filter that valve segment 50 be rotatably adjustable within the valve housing to at least a limited angular extent. Thus, rotational or angular valve adjustment means are provided at the connection between the valve member and mounting plate 98. Such angular adjustment means include the valve flange connecting screw slots 112 and the corresponding tapped screw holes 114 in the mounting plate. With valve flange connecting screws 108 loosened slightly, the valve flange and thus the entire valve member can be rotated about the axis of the valve member to achieve the desired angular adjustment of the valve segment in the valve housing.

To ensure that this angular adjustment can occur without disturbing the seating adjustment of the valve member within the valve housing, mounting plate 98 remains firmly and adjustably secured to the gear housing by the adjusting and connecting means previously described. To further ensure maintenance of the seating adjustment of the valve member during its angular adjustment, the angular adjustment means further includes arcuate shoulders 138 provided on the mounting plate 102 at the intersections of the mounting plate extension flange 102 and ears 104, 105 with the main body of the mounting plate at the valve-facing surface 140, as shown best in FIGS. 5 and 6. Valve-facing surface 140 of the main body of the mounting plate is recessed from the corresponding surfaces of flange extension 102 and ears 104, 105 to form the shoulder 138. This shoulder is precision machined to receive snugly, under close tolerances, the peripheral edge of valve flange 52. Therefore, when the valve member is rotated about its axis, shoulders 138 serve as guideways for the valve flange to maintain the transverse adjustment of the valve member.

When the desired angular adjustment is achieved, valve flange connecting screws 108 are again retightened to secure the valve member to the mounting plate 98. Because the axial and transverse adjustment of the mounting plate has not been disturbed during this procedure, axial and transverse adjustment, or seating, of the valve member is not disturbed either during such angular adjustment procedure.

Figure 8:
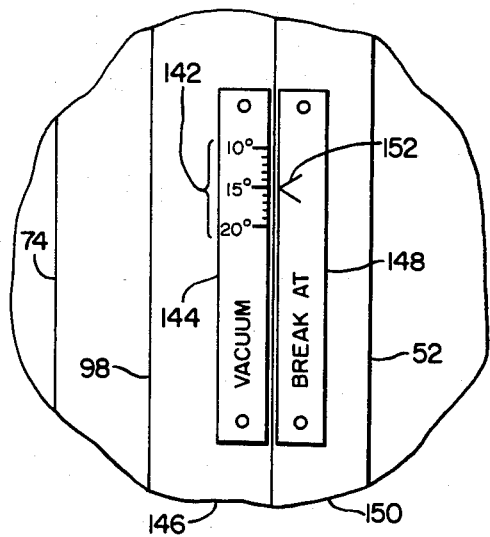
FIG. 8 is an enlarged view of the valve angle adjustment indicator of FIG. 2.

As shown best in FIG. 8, the angular adjustment means for the valve member further include calibration means for precisely determining the angular adjustment of the valve member during the described angular adjustment procedure. Such calibration means include calibrations 142 in degrees provided on a plate 144 attached to a peripheral edge surface 146 of mounting plate 98. Another plate 148 attached to the mating peripheral edge surface 150 of valve flange 52 includes an indexing pointer 152. In FIG. 8, the pointer is set at 15°. This means that when a given point on the surface of the filter drum rotates 15° beyond the twelve o'clock position in a clockwise direction, the valve segment will cut off vacuum to that portion of the drum surface, enabling removal of the pulp mat. By rotating the valve member about its axis either way from that 15° position shown, the positin on the drum surface at which vacuum is cut off can be adjusted from 1°-5° to either side of the 15° position to accomodate the maximum angular adjustment of the valve that should be needed.

As shown best in FIG. 5, mounting plate 98 includes an arcuate segment 154 which is sized and positioned to form a continuation of the valve segment extension 60 of the valve member. Mounting plate segment 154 is also aligned with elbow segment 78. The angular extent of the valve segment extension 60 shown is about 120°. However, as shown, the angular extent of both the mounting plate segment 154 and elbow segment 78 is only about 110°, slightly less than that of the valve segment. The reason for this is to ensure that the mounting plate and elbow extensions will not present any downstream obstructions to discharge flow when the valve member is angularly offset from its 15° setting shown so that valve segment 60 is not perfectly aligned with the mounting plate and elbow segments. With the 10° difference in the arcuate lengths of the valve and other segments, neither the plate nor elbow segment will extend circumferentially beyond the valve segment, and thus neither will present an obstacle to flow. In fact, when the valve member is angularly adjusted to its maximum extent in either direction, that is, up to 5° to either side of the 15° mark shown in FIG. 8, one edge of the valve segment 60 will be flush with corresponding edges of the mounting plate and elbow segments.

Normally, with the valve set at 15°, both ends of valve segment 60 will slightly overlap the corresponding ends of the mounting plate and elbow segments. Thus, the cross sectional area of the flow path in the downstream direction will increase slightly proceeding from the valve member through the mounting plate, but without any obstructions to flow in that direction. The foregoing described difference in the angular extent of the different segments is illustrated in FIG. 7. The angle 156 represents the angular extent of the plate and elbow segments adjacent the inlet end of the elbow. Angle 158 represents the angular extent of the valve extension segment adjacent the mounting plate and elbow inlet. FIG. 7 also illustrates the relative angular positions of the valve segment 60 and mounting plate segment 154 with the valve angularly adjusted to its 15° position shown in FIG. 8.

OPERATION AND VALVE MOUNTING PROCEDURE

From the foregoing, it will be apparent that the valve-discharge elbow assembly comprises basically three separate elements, the valve member 22, the discharge elbow 26, and the mounting plate 98. These elements are assembled, mounted, and adjusted as follows:

First, the valve member is secured to the mounting plate using cap screws 108. For example, valve flange 52 and mounting plate 98 would be connected together with the valve flange set at the 15° calibration on the mounting plate. At this point, the elbow is not connected to the mounting plate.

With the mounting plate and valve flange 52 secured together, valve shaft 46 is inserted into bearing sleeve 44. Then mounting plate 98 is loosely connected to gear housing 38 using cap screws 100 so that valve closure segment 50 is roughly seated within valve housing 18.

Then, using axial adjusting bolts 120, transverse adjusting bolts 126 and appropriate feeler gauges inserted through the wide open end of the mounting plate and valve member, the valve segment is seated accurately both axially and tranversely within valve housing 18. When the desired adjustment is achieved, cap screws 100 secure the mounting plate to the gear housing 38 in the adjusted position of the plate.

Thereafter, discharge elbow 26 is connected to the mounting plate using cap screws 110 to secure the elbow flange 74 to the opposite side of plate 98 from the valve member.

With the valve-discharge elbow assembly mounted as described, adjusting bolts 70 are inserted through the elbow flange and mounting plate and threaded through tapped holes 136 in valve flange 52 into abutment against packing gland collar 64. The collar, under the urging of bolts 70, push the packing material 25 into fluid sealing engagement between drive trunnion 24 and sealing rim 54 of the valve member.

With the assembly thus mounted and adjusted the rotary drum filter is ready to be operated. Based on the operating performance of the filter, fine angular adjustment of the valve segment 50 can be made, if desired, without disassembling the valve-discharge elbow assembly. To accomplish this, valve flange 52 is simply loosened from its connection with mounting plate 98 by unthreading cap screws 108 slightly until they can be rotated in their slots 112 in such flange. Then the valve member is rotated within guide shoulders 138 of the mounting plate to a desired new angular setting, as determined by the calibrations 142 on rim 146 of the mounting plate and indexing pointer 152 on the rim of the valve flange. When the desired new setting has been made, cap screws 108 are retightened to secure the valve member to the mounting plate. During this procedure, mounting plate 98 retains its axial and transverse adjustment because it remains secured to the gear housing, and therefore the valve member retains such adjustment also.

When inspection or maintenance of any internal portion of valve member 22 is desired, elbow flange 26 is simply removed from mounting plate 98 by unthreading cap screws 110. Mounting plate 98 remains in its adjusted and secured position on gear casing 38, and valve member 22 remains secured to the mounting plate by cap screws 108. With the elbow removed from the mounting plate, there is easy access to the internal portions of the valve member for any desired purpose. When the inspection or maintenance is completed, the elbow is reconnected to the mounting plate 98 using cap screws 110, again without disturbing any prior adjustment of the mounting plate or valve member.

Having illustrated and described the principles of my invention by what is presently a preferred embodiment thereof, it should be apparent to persons skilled in the art that such embodiment may be modified in arrangement and detail without departing from such principles. I claim as my invention such embodiment and all such modifications coming within the true spirit and scope of the following claims, and all equivalents thereof.

I claim:

1. In a rotary drum filter of the type having a vacuum breaker valve housing within one end of the drum and stationary drum support means at the same end of the drum, a vacuum breaker valve-discharge assembly comprising:
   a stationary valve member, including a valve closure segment at an inlet end thereof for insertion in the valve housing of the drum and a valve discharge end including valve connecting means,
   a discharge elbow defining a flow passage therethrough and including elbow inlet and outlet ends, said elbow inlet end including elbow connecting means,
   a valve mounting means positioned between said valve connecting means and said elbow connecting means, said valve mounting means including first connecting means for connecting said mounting means to the drum support means, second connecting means independent of said first connecting means for connecting said mounting means to the valve connecting means, and third connecting means independent of said first and second connecting means for connecting the mounting means to the elbow connecting means, whereby said elbow and said valve member are indepently mounted to said mounting means and supported by said mounting means from said drum support means.

2. An assembly according to claim 1 including valve seating means cooperable with said valve mounting means for axially and transversely adjusting the position of said valve mounting means on said support means while said valve member is connected to said valve mounting means for seating said valve segment within the valve housing.

3. An assembly according to claim 2 including valve adjusting means cooperable with said valve connecting means and said valve mounting means enabling rotational adjustment of the valve member about its axis on said valve mounting means while said valve member is connected to said valve mounting means and while said valve mounting means remains adjustably connected to said drum support means.

4. An assembly according to claim 3 wherein said valve connecting means comprises a valve flange integral with said valve member, said second connecting means comprises threaded fastener means and said valve adjusting means comprises circumferentially slotted openings through said valve flange for receiving said threaded fastener means to permit rotational movement of said valve member relative to said mounting means about the axis of said valve member while said threaded fastener means interconnects said valve flange and said valve mounting means.

5. An assembly according to claim 3 wherein said valve connecting means includes a valve flange and said valve mounting means includes a mounting plate, said second connecting means including threaded fasteners for securing said flange to said plate, said valve adjustment means including circumferentially slotted openings through said flange for receiving said fasteners and guide shoulder means on said plate for guiding rotation of the flange about the axis of the valve member.

6. An assembly according to claim 5 wherein said valve adjustment means includes angular calibration means on juxtaposed surfaces of said plate and flange for determining the angular extent of relative rotational movement between said flange and plate.

7. An assembly according to claim 2 wherein said valve seating means comprises first threaded adjustment means extending generally axially of said valve member between said valve mounting means and said drum support means for axially adjusting said mounting means on said support means, and second threaded adjustment means extending generally radially of the axis of said valve member between said valve mounting means and said drum support means for transversely adjusting said mounting means on said support means relative to said axis.

8. An assembly according to claim 1 wherein said valve connecting means comprises a valve flange integral with said valve member, said elbow connecting means comprises an elbow flange integral with said discharge elbow, and said valve mounting means comprises a valve plate means independently connectable to said valve flange, said elbow flange, and said support means.

9. An assembly according to claim 8 wherein said first connector means comprises first threaded fasteners for interconnecting said plate and said support means, said second connector means comprises second threaded fasteners for interconnecting said valve flange and said plate means, and said third connector means comprises third threaded fasteners for interconnecting said elbow flange and said plate means.

10. An assembly according to claim 1 including valve seating means for axially and transversely adjusting the position of said valve mounting means on said support means while said valve member is connected to said valve mounting means, valve adjusting means for enabling rotational adjustment of the valve member about its axis relative to said valve mounting means while said valve member is connected to said mounting means and said mounting means is connected to said support means, said valve connecting means comprising a valve flange integral with said valve member, said elbow connecting means comprising an elbow flange integral with said discharge elbow, and said valve mounting means comprising a valve plate independently connected to said valve flange, said elbow flange, and said support means, said first connector means comprising first threaded fasteners for interconnecting said plate and said support means, said second connector means comprising second threaded fasteners for interconnecting said valve flange and said plate, and said third connector means comprising third threaded fasteners for interconnecting said elbow flange and said plate, said valve seating means comprising first threaded adjustment means extending generally axially of said valve member through said plate and into threaded engagement with said support means for axial adjustment of said mounting means relative to said support means, and second threaded adjustment means extending generally radially of the axis of said valve member between said support means and said plate for transversely adjusting said plate relative to said support means, said valve adjusting means comprising circumferentially slotted openings through said valve flange for receiving said second threaded fastener means thereby to permit rotational movement of said valve member relative to said valve mounting plate while said second threaded fastener means interconnect said valve flange and said mounting plate.

11. An assembly according to claim 10 wherein said valve adjusting means includes cooperative calibration means on juxtaposed peripheral edge portions of said mounting plate and said valve flange for indicating the angular position of said valve flange relative to said mounting plate and thereby facilitating angular adjustment of said valve segment within said valve housing.

12. An assembly according to claim 10 for a rotary drum filter which includes a rotary drum drive means at the same end of the drum as said assembly, with said drum support means including a housing for said drive means and the drive means surrounding at least a portion of the valve member, said assembly including an axially movable packing gland collar in surrounding relationship to said valve member adjacent said valve flange, and said assembly including second threaded adjustment means extending axially through said elbow flange, valve mounting plate, and valve flange, into engagement with said packing gland collar for axially adjusting said collar along said valve member for sealing the interface between the stationary valve member and the rotary drive means.

13. An assembly according to claim 10 wherein said valve member includes a rearward extension of said valve closure segment structurally interconnecting said valve segment and said valve flange, said mounting plate including a plate segment corresponding to and in substantial longitudinal alignment with said valve segment extension, said discharge elbow including said elbow flange including an elbow segment corresponding to and in substantial alignment with said plate segment and said valve segment extension, said elbow segment diminishing progressively in angular extent in a direction from the inlet end toward the discharge end of said elbow, said plate segment and elbow segment at the elbow flange having an angular extent slightly less than the angular extent of said valve segment extension such that said plate segment and elbow segment present no obstructions to discharge flow of fluid from the drum filter.

14. An assembly according to claim 1 wherein said valve closure segment includes an axial extension segment extending between said closure segment and said valve connecting means to interconnect said closure segment and said valve connecting means, said mounting means including a mounting segment in substantial alignment with and forming a continuation of said valve extension segment, said elbow including said elbow connecting means including an elbow segment in substantial alignment with and forming a continuation of said valve extension segment and said mounting segment.

15. An assembly according to claim 14 wherein the angular extent of the mounting segment and the elbow segment at the inlet end of said elbow are slightly less than the angular extent of the valve extension segment.

* * * * *